March 15, 1960  S. ROVNER ET AL  2,928,257
BEER COOLER AND DISPENSER

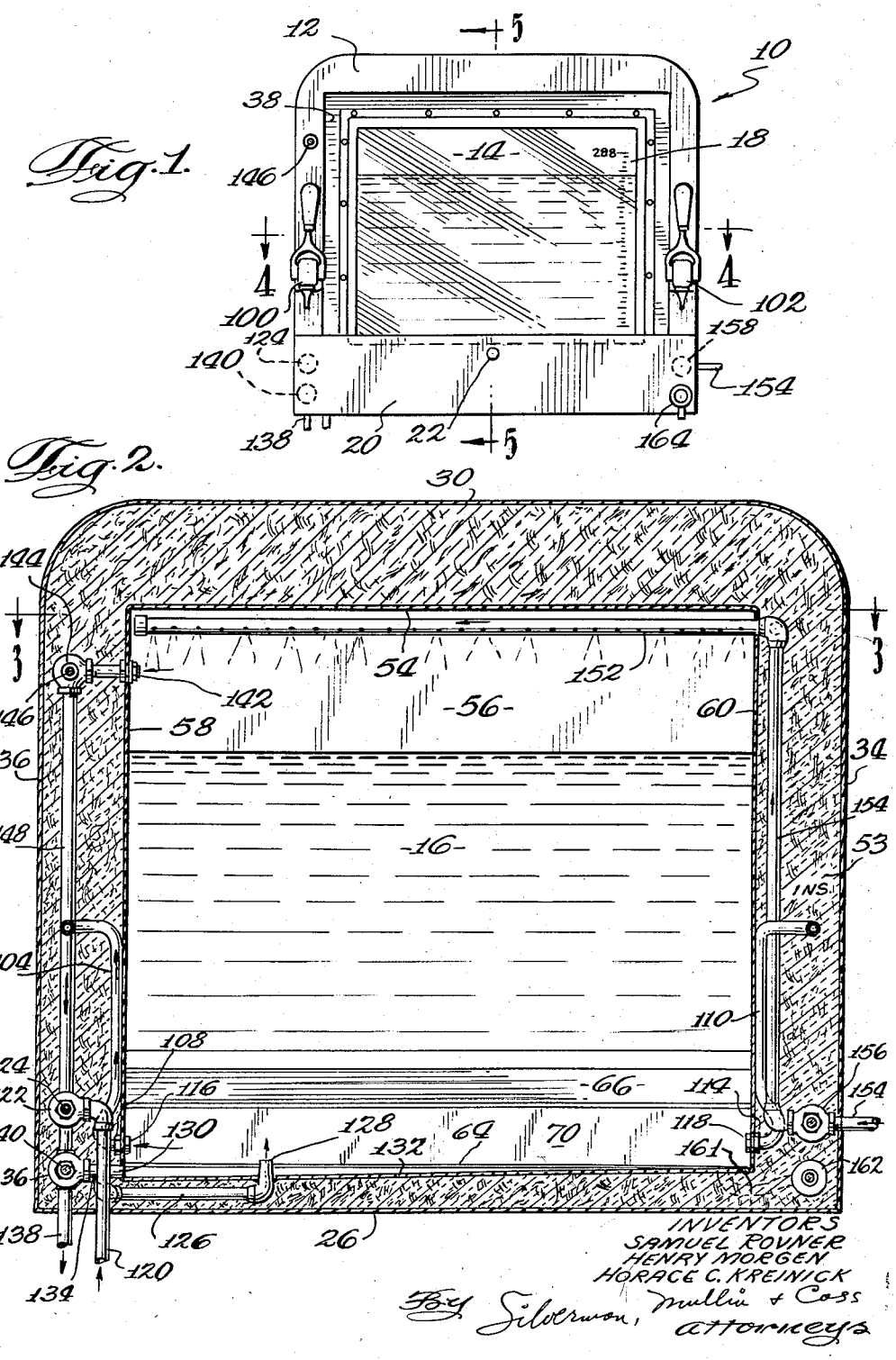

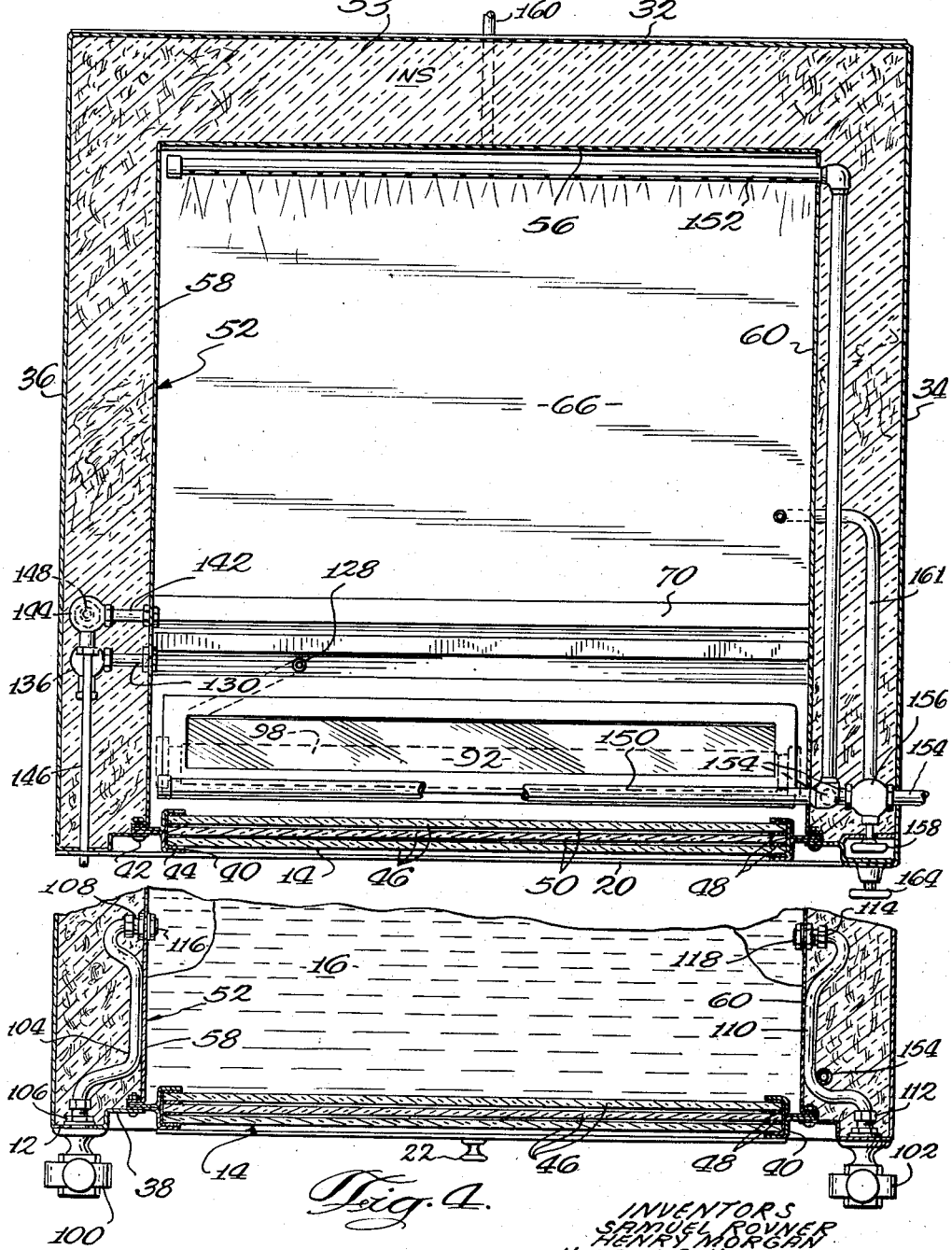

Filed Nov. 29, 1957  3 Sheets-Sheet 3

INVENTORS
SAMUEL ROVNER
HENRY MORGAN
HORACE C. KREINICK
BY Silverman, Mullin & Coss
ATTORNEY

United States Patent Office 2,928,257
Patented Mar. 15, 1960

2,928,257
BEER COOLER AND DISPENSER

Samuel Rovner, Chicago, Henry Morgen, Libertyville, and Horace C. Kreinick, Lincolnwood, Ill.

Application November 29, 1957, Serial No. 699,818

15 Claims. (Cl. 62—264)

This invention relates generally to liquid coolers and dispensers and more particularly is concerned with the construction of apparatus intended to properly cool and dispense liquids which are carbonated, specifically, although not necessarily limited thereto, such as beer, ale, or other malt liquors.

There are many problems which beset one who desires to construct apparatus for the dispensing of liquids such as beer at the proper temperature. Some of these problems will be enumerated below, and while the structure herein is not limited to the dispensing of beer, ale and other malt liquors, since this presents additional problems, the discussion will specifically refer thereto.

Beverages of the kind with which this invention is concerned are dispensed under pressure. Beer and ale is a carbonated beverage whose taste and sparkle require the retention of the occluded gases up to the moment of use. Dispensers which are interposed between the keg and the glass are required to maintain the pressure of the gas under which the beverage is normally kept, and hence such dispensers have not included sumps or tanks because of the pressure problems involved.

Dispensers have heretofore been unable to display the beverages because of pressure problems and the difficulty of providing a pleasing appearance to the beverage. Since it is necessary not only to retain the beverage under pressure but also cool the same, it has been difficult to refrigerate the beverage without cumbersome and complex equipment.

Other problems have to do with the provision of proper relief of gas, drainage, cleaning, etc. of the dispenser and cooler.

The primary object of this invention is the provision of a compact and economical beverage dispenser and cooler which will overcome all of the problems above set forth and in which there is a substantial volume of the beverage displayed and illuminated in a pleasing manner; which will have means for ascertaining the volume of beverage dispensed over a given time enabling the proprietor to have a check on the amount of receipts which should have been realized; which will have a water cooler in addition to the beverage cooler and means to admit water to the water cooler and dispense the same therefrom; which will have all of the controls and valves for the apparatus easily accessible at the front thereof; which is simple to construct, use and keep clean.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a front elevational view of the beverage cooler and dispenser of the invention.

Fig. 2 is a vertical sectional view taken through the apparatus immediately behind the cover glass thereof.

Fig. 3 is a sectional view taken generally along the line 3—3 of Fig. 2 and looking in the direction indicated.

Fig. 4 is a fragmentary sectional view taken generally along the line 4—4 of Fig. 1 and in the indicated direction.

Figure 5:
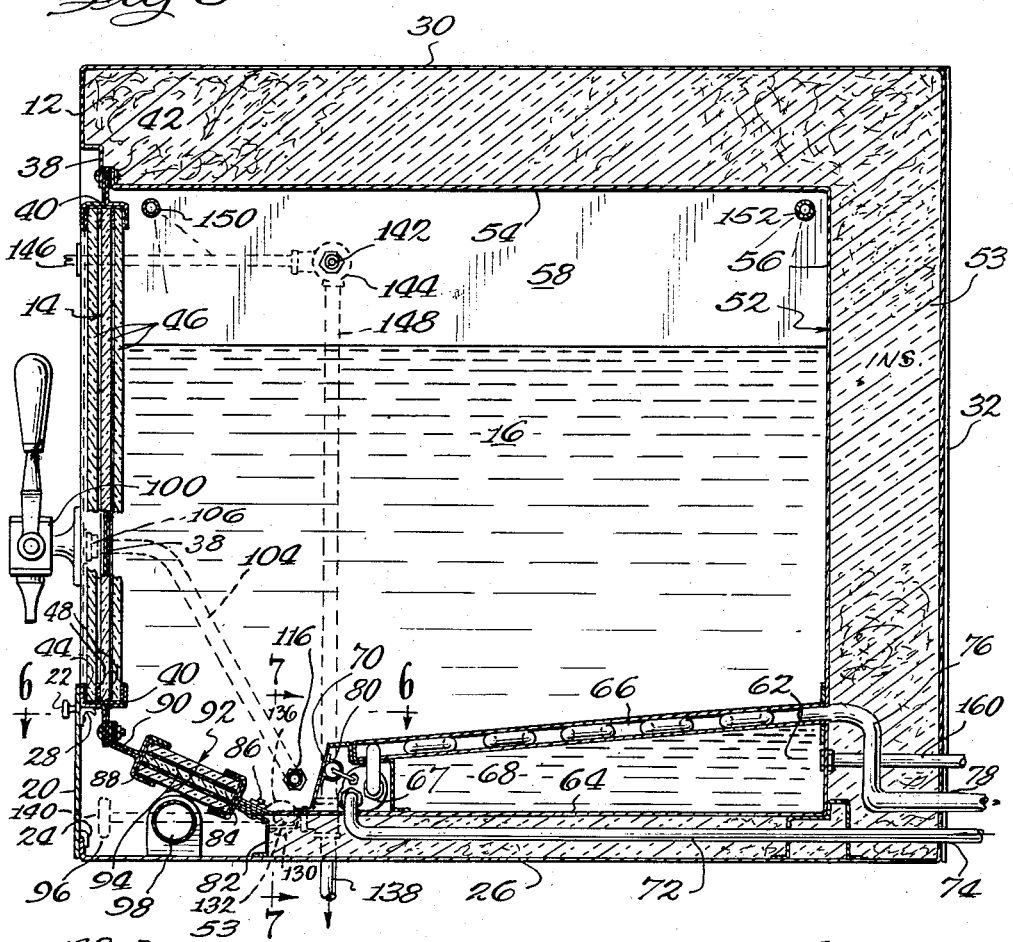
Fig. 5 is a vertical sectional view taken generally along the line 5—5 of Fig. 1 and in the indicated direction.

The reference character 10 is used to designate the beverage dispenser generally, the same being shown best in elevation in Fig. 1. Externally, the dispenser has the appearance of a cabinet of any suitable metal such as stainless steel, or the like or the same may be formed of some decorative material such as wood or plastic. The front wall 12 has a cover glass assembly designated generally 14 throughout which the beverage 16 may be viewed and measured by a graduated scale 18 provided along one side of the cover glass assembly 14. The lower portion of the front wall is provided with a cover member 20 which has a pull knob 22 and is held in place (Fig. 5) by any suitable fastener clips 24 to the bottom wall 26 of the cabinet. Other fastener clips 28 may co-operate with other structure.

The cabinet includes a top wall 30 and a rear wall 32 as well as side walls 34 right and 36 left. The cabinet may be formed in any manner, as by welding, or the like depending upon the material from which the same is made. The front wall 12 has a framing portion 38 within which the cover glass assembly 14 is mounted. This may take any suitable form such as for example that shown. There is provided a channel member 40 which is here shown as formed of front and rear angled strips clamped together by suitable bolts 42 which also hold the assembly to the framing portion 38. The channel member 40 engages the assembly 14 about its complete periphery and has suitable gaskets 44 to keep the beverage from leaking past the assembly. The assembly is comprised of a plurality of glass or other transparent members such as plastic sheets 46 separated by gaskets 48 to provide insulating air spaces 50, all clamped together.

On the interior of the dispenser 10, and spaced within the exterior walls, there is provided a beverage tank designated generally 52. The intervening space is packed with insulating material 53 of any desirable type, such as glass wool, so that the temperature of the beverage 16 may be kept to a desired level. The tank 52 is formed of metal except for the front wall thereof which comprises the interior face of the cover glass assembly 14. The top wall is designated 54, the rear wall 56, the left side wall 58 and the right side wall 60. The bottom of the tank 52 has a compartment 62 toward the rear thereof formed by a bottom wall 64 and the refrigeration unit 66 which is adapted to hold cold water 68. The refrigeration unit is of a type available commercially as an integral sealed unit in plate form and it is soldered or welded in place between the rear wall 56 at the side walls 58 and 60 and engages against a fluid tight elongate channel structure 70 which is welded to the bottom wall 64. The channel structure 70 houses the expansion valve structure 67 for the refrigeration unit 66 and is supplied with refrigerant from the compressor external of the apparatus 10 by way of a conduit 72 which enters the rear of the structure at 74 passes between the bottom walls 26 and 64 and enters at one end of the structure 70. The refrigerant passing through the unit 66 leaves by way of a conduit 76 passing through the rear wall 56 of the tank 52 and the rear wall 32 of the cabinet at 78. A thermostat 80 is also contained in the channel structure 70 engaged against the front wall thereof to be exposed to the temperature of the beverage 16 at the lowest level thereof from which said beverage is dispensed as will be explained.

It will be seen that a simple arrangement is provided which not only cools the beverage 16 but also provides a compartment 62 for holding and cooling drinking water.

The bottom wall 64 of the tank 52 is not as long as the top wall 54 and has a flange 82 at its forward end to which is secured a channel formation 84 by suitable clamping means such as the bolts 86. The details of such a formation are illustrated and embody sheet metal techniques which are well known. The formation 84 is substantially the same as the formation 40 which frames the cover glass assembly 14. A similar channel formation 88 is also provided opposite the formation 84 and this latter is connected by a suitable metal structure 90 to the bottom portion of the channel structure 40.

The channel structure 88 and 84 support between them a narrow assembly 92 of transparent or translucent members 94 of glass or plastic sheeting, in fluid and pressure tight engagement. The gasket and spacing arrangement of this assembly may be the same as in the case of the assembly 14. It will be noted that the assembly 92 is at the bottom of and forward end of the tank 52 and is slanted so as to provide a chamber 96 access to which is obtained through the cover plate 20. A fluorescent lamp and suitable sockets and ballast therefor are disposed in the chamber 96 as indicated at 98 in proximity to the assembly 92 so that light from the elongate lamp will illuminate the interior of the tank, passing through the beverage 16 and giving a very pleasing and striking appearance.

The beverage 16 is dispensed from two spigots or taps 100 and 102 which are installed in the front wall 12 alongside the framing portion 38. As best shown in Fig. 4, the spigot 100 is connected to the tank by way of a conduit 104 which lays against the exterior of the wall 58 so as to cool the beverage which remains in the conduit awaiting dispensation. Suitable unions or other couplings 106 and 108 provide the necessary fluid and pressure tight connections with the front wall 12 and the tank wall 58. The spigot 102 also has its conduit 110 laying against the wall 60 to have the heat removed therefrom and is connected by unions and couplings 112 and 114 to pass through the right hand panel of the wall 12 and the side wall 60. The outlet ports 116 and 118 of the tank 52 leading to the spigots 100 and 102 are located in the lowermost portion of the tank 52, since the coolest beverage will gravitate to the bottom of the tank.

Figure 6:
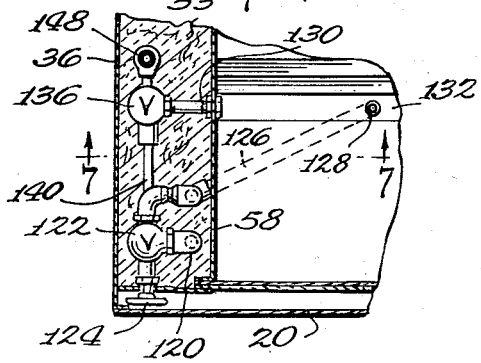
Fig. 6 is a fragmentary detailed sectional view taken generally along the line 6—6 of Fig. 5 and in the indicated direction.

The beverage is admitted to the tank under pressure along with gas from a suitable keg or tank external of the apparatus through the bottom of the structure 10 by way of a conduit 120 as shown in Fig. 2. This conduit connects with a valve 122 in the lower forward part of the cabinet (Fig. 6) controlled by a handle 124 which can be reached by removing the front cover plate 20. The valve 122 connects with a conduit 126 that passes under the wall 58 to the interior of the tank 52 in the bottom thereof, where the inlet port 128 is disposed. In the case of beverages which may have sediment, ports 116 and 118 may be spaced further above the bottom than shown.

Figure 7:
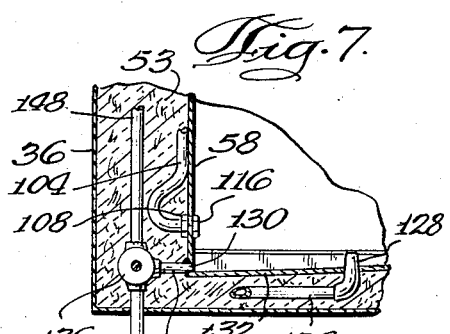
Fig. 7 is a fragmentary sectional detailed view taken generally along the line 7—7 of Fig. 5 and in the indicated direction.

The tank 52 is also provided with means for draining the same. The outlet port 130 is shown at one end of the tank 52 adjacent the wall 58, the bottom wall 64 being provided with a pitched portion 132 (Fig. 7) so that the beverage may drain into the port. This drainage port connects with a conduit 134 which leads through a valve 136 to the drain conduit 138 that passes out the bottom of the apparatus 10, through the bottom wall 26. The valve 136 is also controlled by a handle 140 that is reached by removing the cover plate 20. The gas pressure above the beverage 16 is relieved through a port 142 in the side wall 58 through a regulating valve 144 controlled by a suitable adjusting screw 146 located on the front wall 12 of the apparatus. The relief valve is adjusted for any desired pressure, and its outlet is connected by conduit 148 directly to the drain 138.

In order to clean the interior of the tank 52, flush heads in the form of a pair of transverse spray pipes 150 and 152 are mounted in the upper portion of the tank 52, extending through the side wall 60, and connected to a source of flush water by the conduit 154. A valve 156 is interposed to control the flushing action, and the valve is manipulated by a handle 158 access to which is achieved by removing the cover plate 20.

An inlet to the water tank 68 is shown at 160, the outlet being by way of any suitable conduit 161 controlled, for example, by another valve such as indicated generally at 162 access to which may be gained by removing the cover plate. Since the water is under no more than the supply main pressure, there is no problem in providing this means of inlet and outlet. If desired, the water valve control may be provided continuously exposed and a faucet made available at the front of the dispenser as shown at 164.

It is believed that the invention has sufficiently been explained to obviate additional details, and it should be appreciated that the circuits are capable of wide variation in their elements and minor details without departing from the spirit or scope of the invention as defined by the appended claims.

What we desire to secure by Letters Patent of the United States is:

1. Apparatus for cooling and dispensing a beverage under pressure comprising, an insulating cabinet having an internal metal storage tank for the beverage, said tank and cabinet having a gasketed window assemblage forming a common wall therefor which enables beverage stored in the tank to be visible from exterior of the cabinet, a sealed refrigeration unit supported to form a wall of the tank and means for leading a refrigerant through the unit from a high pressure source of the refrigerant exterior of the cabinet, conduit means connected with said tank for supplying beverage thereto, and a dispensing device supported on a wall of said cabinet and connected with said tank for dispensing the beverage.

2. Apparatus as described in claim 1 in which said unit comprises an integral plate-like device secured laterally across the tank to divide same into a pair of compartments separated one from the other, at least one of said compartments arranged to have the beverage stored therein visible from exterior of the cabinet.

3. Apparatus as described in claim 2 in which said cabinet has a chamber separated from said tank, said tank and chamber have a common wall of gasketed aligned windows, and there is a light source in said chamber for transmitting light through said aligned windows into the stored beverage for illuminating same.

4. Apparatus as described in claim 2 in which second conduit means are provided to connect with the second compartment for supplying same with a second beverage to be cooled also by said unit, and a second dispensing device for dispensing the second beverage supported on the cabinet.

5. A carbonated beverage cooler and dispenser comprising, an insulating cabinet having a metal storage tank on the interior thereof, said tank and cabinet having a common wall comprising a unitary assemblage of gasketed, substantially transparent plate members enabling the beverage in the tank to be visible from exterior of the cabinet, a sealed, plate-like refrigeration unit secured on the interior of the tank adjacent the bottom end thereof of suitable dimensions to effectively divide the tank into a pair of separated compartments of which at least one is disposed opposite said common wall, conduit means for separately leading refrigerant from a high pressure external source to said unit and beverage under pressure from an external source thereof into said one compartment, and a dispensing spigot supported on a wall of said cabinet connected with said tank.

6. Apparatus as described in claim 5 in which said one compartment has a window and said cabinet has a light source arranged to transmit light into said one compartment through said window thereof for illuminating the beverage stored in said one compartment.

7. Apparatus as described in claim 5 in which said common wall includes a framing portion at the front end of said cabinet, a channel member secured around the inner periphery of said framing portion and said plate members are retained in said channel member such that the interior surface of the assemblage forms a wall of said one compartment.

8. Apparatus as described in claim 7 in which the tank has a top wall and a bottom wall shorter than said top wall, said unit is spaced above said bottom wall, a channel formation having a central aperture secured between said bottom wall and said framing portion forming a third compartment adjacent the bottom end of the cabinet separated from the other compartments, a transparent cover member secured in said aperture and an electric light source provided in said third compartment adapted to transmit light through the cover member for illuminating beverage in said one compartment.

9. Apparatus as described in claim 5 in which said tank has flushing means extending transversely therethrough adjacent the upper end thereof and outwardly of said cabinet for connection to a source of flush water for cleansing the interior of said tank.

10. Apparatus as described in claim 5 in which said cabinet has a front wall in which a said plate member is provided, the lower portion of said front wall being removable to permit access into the interior of the cabinet.

11. Apparatus as described in claim 5 in which said dispensing device includes a coupling with said tank adjacent the bottom thereof, said coupling being disposed against an exterior wall of the tank along a substantial length of the coupling so as to enable heat transfer between said tank wall and coupling.

12. Apparatus as described in claim 1 in which said cabinet has a removable cover plate adjacent the bottom end thereof providing access to a chamber on the interior of the cabinet separated from said tank, said chamber having a light source therein and a transparent wall permitting transmission of light therethrough into said tank, said conduit means including a control valve situated in said chamber.

13. Apparatus as described in claim 5 in which said tank is provided with pressure relieving means communicating with the ambient atmosphere exterior of the cabinet.

14. A carbonated beverage cooler and dispenser comprising, an insulating cabinet having a metal storage tank on the interior thereof, said tank and cabinet having a common wall comprising a unitary assemblage of gasketed, substantially transparent plate members enabling the beverage in the tank to be visible from exterior of the cabinet, a sealed, plate-like refrigeration unit secured on the interior of the tank adjacent the bottom end thereof of suitable dimensions to effectively divide the tank into a pair of separated compartments of which at least one is disposed opposite said common wall, conduit means for separately leading refrigerant from a high pressure external source to said unit and beverage under pressure from an external source thereof into said one compartment, and a dispensing spigot supported on a wall of said cabinet connected with said tank, said refrigeration unit arranged to cool beverage stored in either of said compartments, conduit means for supplying the second compartment with a beverage and a dispensing nozzle on said cabinet for withdrawing beverage from said second compartment.

15. Apparatus for cooling and dispensing a beverage under pressure comprising, an insulating cabinet having an internal metal storage tank for the beverage, said tank and cabinet having aligned windows enabling beverage stored in the tank to be visible from exterior of the cabinet, a sealed refrigeration unit supported on the interior of the tank and means for leading a refrigerant through the unit from a high pressure source of the refrigerant exterior of the cabinet, conduit means connected with said tank for supplying beverage thereto, and a dispensing device supported on a wall of said cabinet and connected with said tank for dispensing the beverage, said cabinet being a substantially rectilinear structure including a front wall in which the said windows are provided, said refrigerating unit forming the bottom wall of said tank, said tank being substantially rectilinear and having said unit extending from the rear wall thereof to a point spaced from said front wall, a channel structure connecting with the forward end of said refrigeration unit, said channel structure extending across the tank transverse to the refrigeration unit, and control elements being housed in said channel structure for controlling the pressure of the refrigerant supplied to the unit and the temperature at which the beverage is stored in the tank.

References Cited in the file of this patent

UNITED STATES PATENTS

| | | |
|---|---|---|
| 1,965,877 | Bost | July 10, 1934 |
| 2,418,715 | Johnson | Apr. 8, 1947 |
| 2,513,610 | Williams | July 4, 1950 |
| 2,732,688 | Dickson | Jan. 31, 1956 |
| 2,753,121 | Elfenbein | July 3, 1956 |